(12) United States Patent
Alsbury et al.

(10) Patent No.: US 8,239,765 B2
(45) Date of Patent: Aug. 7, 2012

(54) DISPLAYING STACKED BAR CHARTS IN A LIMITED DISPLAY AREA

(75) Inventors: Quinton Alsbury, Venice, CA (US); David Becerra, Venice, CA (US)

(73) Assignee: Mellmo Inc., Solana Beach, CA (US)

( * ) Notice: Subject to any disclaimer, the term of this patent is extended or adjusted under 35 U.S.C. 154(b) by 540 days.

(21) Appl. No.: 12/413,496

(22) Filed: Mar. 27, 2009

(65) Prior Publication Data
US 2010/0251151 A1 Sep. 30, 2010

(51) Int. Cl.
G06F 17/00 (2006.01)
(52) U.S. Cl. .......................... 715/273; 715/864
(58) Field of Classification Search .................. 715/273, 715/864, 788
See application file for complete search history.

(56) References Cited

U.S. PATENT DOCUMENTS

| | | | |
|---|---|---|---|
| 5,619,631 A * | 4/1997 | Schott | 345/440 |
| 5,634,133 A * | 5/1997 | Kelley | 715/209 |
| 5,844,572 A * | 12/1998 | Schott | 345/440 |
| 7,089,096 B2 * | 8/2006 | Liebl et al. | 701/33.4 |
| 7,779,344 B1 * | 8/2010 | Hao et al. | 715/215 |
| 2006/0055693 A1 * | 3/2006 | Sylthe et al. | 345/419 |
| 2006/0059439 A1 * | 3/2006 | Hao et al. | 715/805 |
| 2006/0070013 A1 * | 3/2006 | Vignet | 715/854 |
| 2007/0268317 A1 * | 11/2007 | Banay | 345/660 |
| 2007/0271500 A1 * | 11/2007 | Theophil et al. | 715/503 |
| 2008/0192056 A1 * | 8/2008 | Robertson et al. | 345/440 |
| 2010/0058250 A1 * | 3/2010 | Stannard et al. | 715/856 |
| 2010/0214299 A1 * | 8/2010 | Robertson et al. | 345/440 |
| 2010/0231595 A1 * | 9/2010 | Dang et al. | 345/440 |

OTHER PUBLICATIONS

Heer et al., Animated Transitinos in Statistical Data Graphics, IEEE, IEEE Transactions on Visualizations and Computer Graphics, vol. 13 No. 6, 2007, p. 1240-1247.*
PCT International Search Report and Written Opinion, PCT Application No. PCT/US2010/028817, May 20, 2010, 6 pages.

* cited by examiner

*Primary Examiner* — Laurie Ries
*Assistant Examiner* — Frank D Mills
(74) *Attorney, Agent, or Firm* — Fenwick & West LLP

(57) ABSTRACT

A system and a method are disclosed for visually displaying data points using stacked bar charts on a display screen with limited display area. A magnification region allows presentation of detailed information for a stacked bar compared to other stacked bars displayed. A stacked bar within a magnification region can be further magnified to display additional information for individual bars within the stacked bar. An individual bar is expanded to a height suitable for displaying information associated with the bar. The stacked bar chart can be moved relative to the magnification region thereby changing the stacked bar displayed within the magnification region.

26 Claims, 10 Drawing Sheets

DISPLAYING STACKED BAR CHARTS IN A LIMITED DISPLAY AREA

BACKGROUND

1. Field of Art

The disclosure generally relates to displaying reports on a device having a display area that is small relative to the amount of data that is being displayed.

2. Description of the Related Art

There are several ways of using charts or graphs to visually present statistical data available in reports including, for example, bar charts, pie charts, line graphs, and scatter graphs. On a mobile device such as a handheld device, handheld computer, cell phone, tablet computer, or personal digital assistant (PDA), graphs and charts have to be displayed on small display screens with display areas that are limited in size compared to the data being shown. There are several challenges in trying to show graphs and charts on such devices. For example, FIG. 1 illustrates a stacked bar chart and some of the obstacles encountered in displaying a stacked bar chart on a small screen. FIG. 1 displays an x-axis 135, a y-axis 130 and the corresponding x-coordinate values 145 and the y-coordinate values 140 for the stacked bar chart. Each stack 120 in a stacked bar chart corresponds to an x-coordinate value and represents multiple y-coordinate values where each value is displayed by a bar in the stack with height determined by the y-coordinate value corresponding to the bar. For example, the stacked bar 120 has three bars 105, 110, and 115 each representing a different y-coordinate value. The height of the stacked bar 120 corresponds to the aggregate y-coordinate value of all the bars in the stack. Additional information corresponding to the different kinds of bars may be represented by a legend 125. The height of each bar in a stack 120 is proportional to the value represented by the bar. Due to the fixed resolution of typical display screens, two values that are very close may be represented by bars appearing to have the same height. Hence, the height of the bars may not truly represent the corresponding y-coordinate value. In addition, it is difficult for a viewer to know the exact value corresponding to each bar 105, 110, or 115 or the aggregate value of the stacked bar 120 by looking at the stacked bar.

SUMMARY

The present invention enables the display of stacked bar charts on a device having a display area that is small compared to the amount of data being shown in the chart. Examples of suitable devices include tablet computers, smart phone devices, and mobile phones. A magnification region allows a portion of a chart or graph data to be displayed at a larger size that can display additional information compared to the graphic data displayed outside of the magnification region. Individual bars within the stacked bar can be further magnified to display information specific to the bar. A bar that is magnified is expanded to a height that is determined by the amount of information to be displayed for the bar. Visual indications associated with the bar in some embodiments indicate that the height of the bar is not indicative of its y-coordinate value, for example by displaying the bar as wiggling. When a bar in the stacked bar is expanded, the other bars in the stack may be reduced in height to accommodate the increase in height of the expanded bar. The location of either the chart or the magnification region can be moved to view detailed information for different stacked bars. Navigation mechanisms allow a user to efficiently reach a particular set of adjacent stacked bars that the user wants to magnify.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The Figures and the following description relate to various embodiments by way of illustration only. It should be noted that from the following discussion, alternative embodiments of the structures and methods disclosed herein will be readily recognized as viable alternatives that may be employed without departing from the principles of what is claimed

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
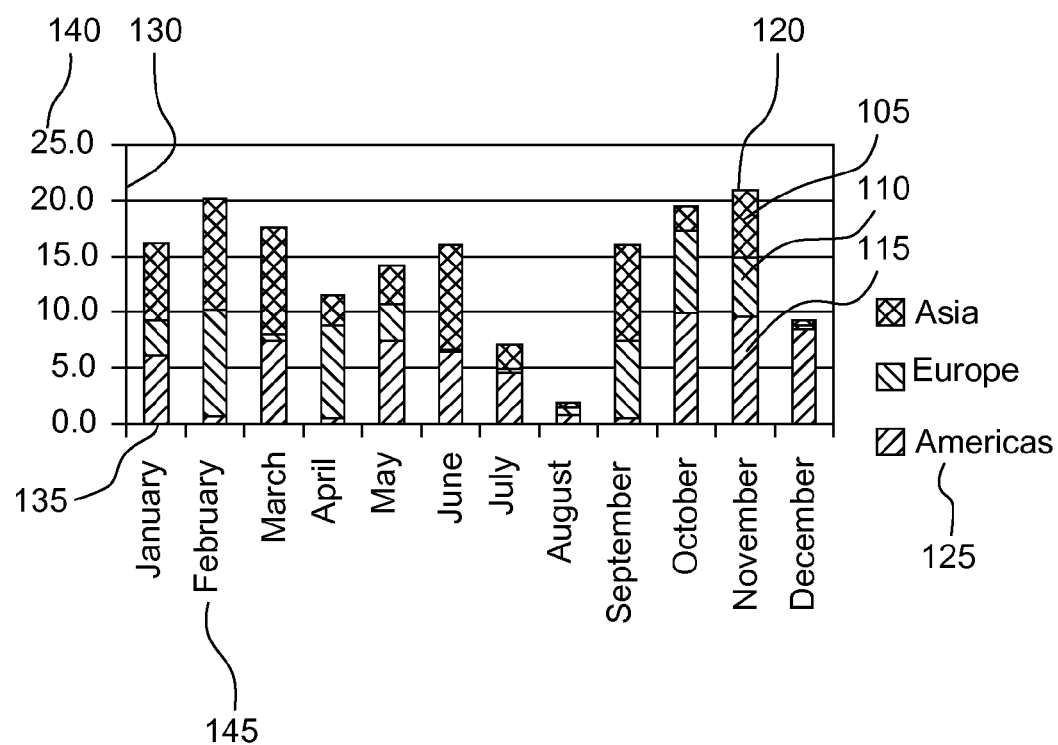
FIG. 1 illustrates a conventional system displaying a stacked bar graph.
Figure 2:
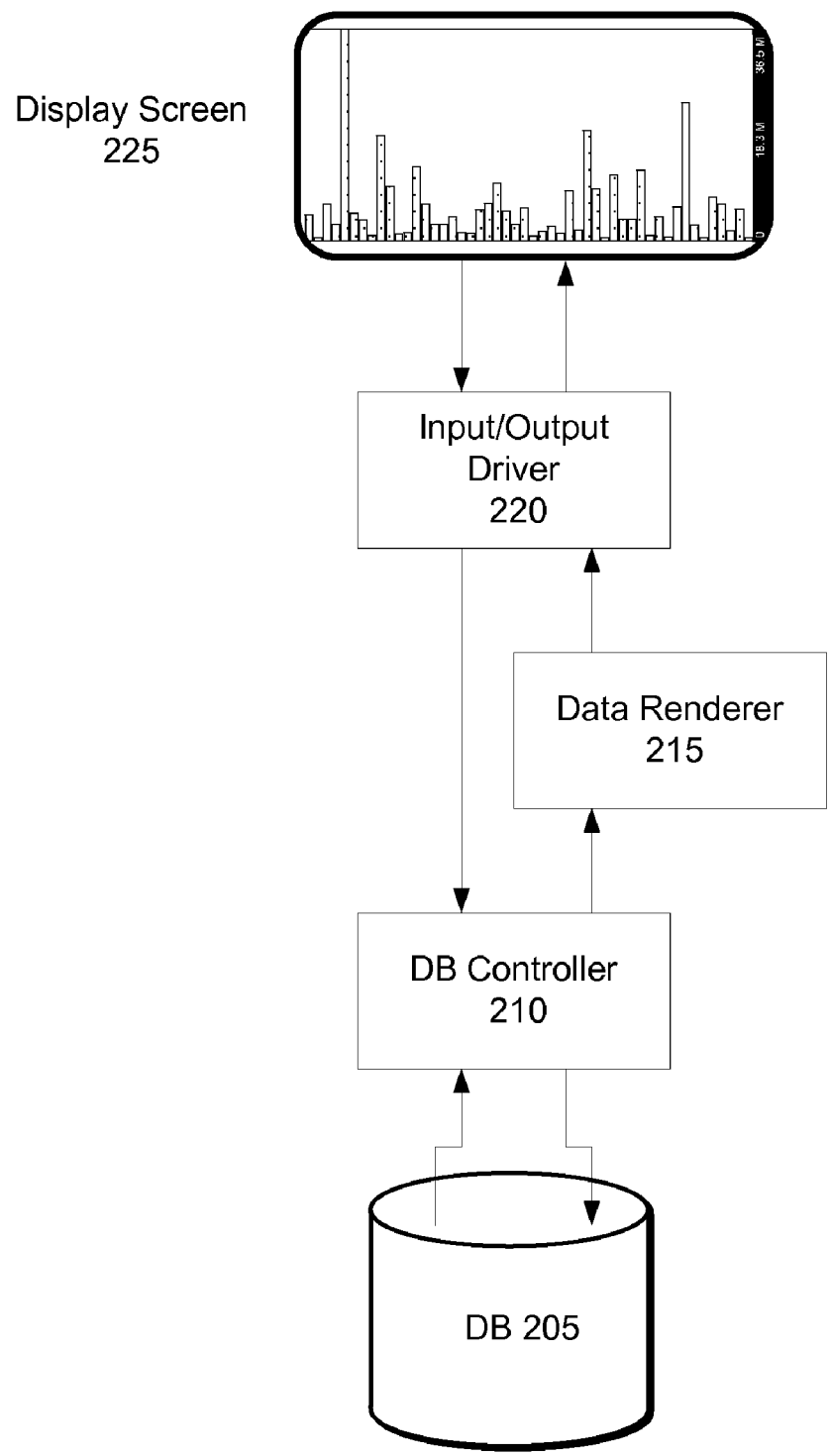
FIG. 2 illustrates one embodiment of the architecture of a system for displaying data as bar graphs.

FIG. 2 is a block diagram of a system architecture in accordance with one embodiment. The components shown in FIG. 2 include a database (DB) 205, a DB controller module 210, a data renderer module 215, an input/output driver (I/O driver) module 220, and a display screen 225. Components such as the display screen 225 are hardware components whereas the DB controller 210 and the chart renderer 215 are software modules. As used herein, the term "module" refers to a computer program logic and/or data for providing the specified functionality. A module can be implemented in hardware, firmware, and/or software. Examples of types of computers that implement the system shown in FIG. 2 include tablet computers, smart phone devices, and mobile phones.

The DB 205 stores data and metadata associated with reports. The DB 205 in one embodiment is implemented using a hard disk drive but can also be implemented using any other device capable of storing data, such as a writeable compact disc (CD) or DVD, or a solid state memory device, for example a flash memory. The DB controller module 210 implements the logic to interface with the DB 205 so as to read data from the DB 205 or write data to the DB 205. The DB controller 210 provides data to the data renderer module 215, which computes information required for rendering the data. For example, the data renderer can determine the dimensions of a pie chart if the data needs to be displayed as a pie chart. The data and the information necessary for rendering the data are provided by the data renderer 215 to the input/output driver 220. The input/output driver 220 provides the display screen 225 with instructions and data necessary for displaying data and/or images. In various embodiments, the display screen 225 is used to input data and/or commands. For example, a touch sensitive screen can sense the coordinates of the portion of the screen touched by a user. The user may touch the display screen 225, for example, to select a command from a list of commands or to select a data element from a list of data elements displayed on the screen. In various embodiments, the display screen 225 can be tilted by the user. The magnitude and direction of tilt of the display screen 225 is detected and can be treated as an input. The angle of the tilt of the display screen is provided to the input/output driver 220 by hardware components such as an accelerometer. In some embodiments, a pointing device, such as a thumbwheel, mouse, track ball, or other type of pointing device is used to input data or commands into the system. The input/output driver 220 sends the data or instructions provided by the display screen 225 to the DB controller 210. The DB controller 210 in response to data or instructions received from the input/output driver 220 reads data from DB 205 and writes data to DB 205.

A mobile device may be used to view reports available to a user. An example scenario allows the user to associate a particular report with a display mode, such as a pie chart, bar chart, or text mode. To allow the user to create an association between the report and a display mode, the user is presented with a list of display modes. The user may make a selection by touching the appropriate portion of the display screen 225 showing a specific mode of display, or by providing input through another mechanism such as a keyboard or pointing device. The DB controller 210 updates the metadata of the appropriate report in the DB 205 to store the information related to mode of display of the report. The information associating the report with a mode of display is used subsequently to display the report.

In another scenario, the user may be presented with a list of reports that can be reviewed. The user selects a particular report name and data renderer 215, computes information to render the data which is then displayed on display screen 225 in the specified format. Various other scenarios of interactions between the user and the various components and modules displayed in FIG. 2 are possible.

Figure 3:
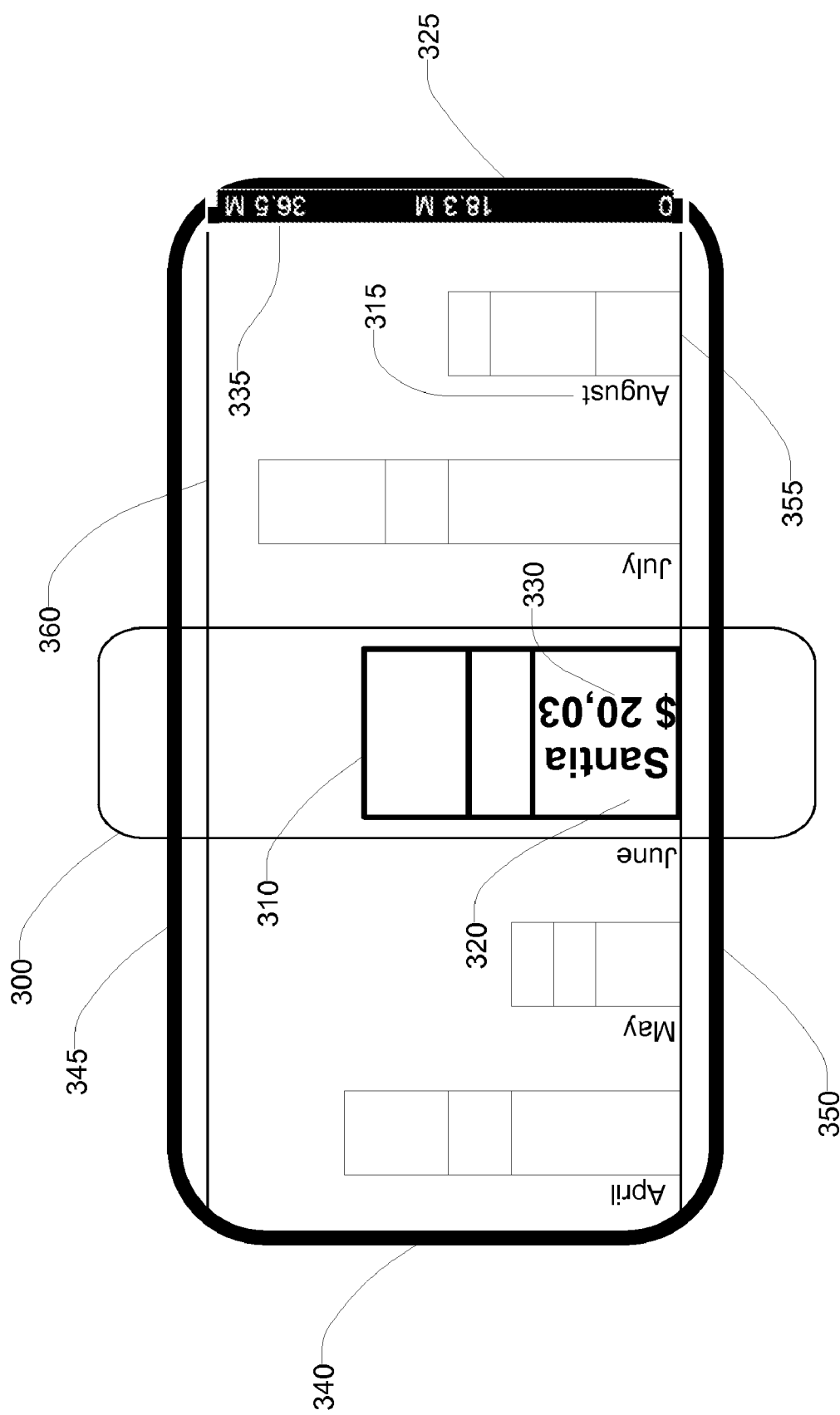
FIG. 3 illustrates how a magnification region displays a magnified bar.

FIG. 3 illustrates how a magnification region 300 can be used on a display screen 225 to effectively present a visual representation of a report using a stacked bar chart. The display screen comprises four edges, a left edge 340, a right edge 325, a top edge 345, and a bottom edge 350. Note that the naming of an edge, e.g., as a "bottom", is for clarity of description—a particular device may support use in multiple orientations, in which case the physical edge of the device that is the "bottom" or "top" in one orientation can easily become a different edge in an alternative orientation. Our description here is not intended to be limited to a particular orientation. The x-axis is shown adjacent to the bottom edge 350 and the values 335 corresponding to the y-axis are shown adjacent to the right edge 325. The chart is displayed in an area enclosed within the edges of the display screen. For example, in FIG. 3 the chart area is within the lower chart edge 355 and an upper chart edge 360.

A user can activate the magnification region 300 in a stacked bar chart with a default display by providing input, for example, by selecting a stacked bar in the default display of a stacked bar chart using a pointing device. Alternatively, the magnification region 300 can be displayed in a fixed portion of the display screen and the stacked bars of the stacked bar chart moved along the x-axis based on user input to cause specific stacked bars to overlap the magnification region to be magnified.

A stacked bar displayed within the magnification region 300 is called a magnified stacked bar 315 and a stacked bar displayed outside the magnification region 300 is called a standard stacked bar 310. A magnified stacked bar is displayed using bars larger than or at least as large as a standard bar. The x-axis values 305 are shown next to each stacked bar 315. In one embodiment, the magnification region 300 is a rectangular area with height at least as large as the maximum stacked bar height in the graph and a width at least as large as a standard stacked bar 310. The width of the magnified stacked bar 315 is larger than the width of a standard stacked bar 310 to allow information to be displayed for bars of the stacked bar. However the height of the bars in a magnified stacked bar by default may be same as the height that is displayed if the stacked bar was not magnified. In certain embodiments, a magnified bar by default displays the information related to the largest bar displayed in the magnified stacked bar. The information is displayed overlaying the corresponding bar with indication that the information is associated with the bar. Alternatively the information to be displayed 330 is truncated if necessary to display the information within the bar. For example, in FIG. 3, the text 330 "Santia $20.03" is a truncated version of text "Santiago $1,548,943" corresponding to the value of the data point represented by the bar 320. An alternative embodiment displays information associated with an aggregate value based on the bars of the stacked bar. For example, the sum of the y-coordinate values associated with each bar within the stacked bar can be displayed representing the cumulative height of the stacked bar. The text corresponding to the aggregate information associated with a stacked bar is displayed overlaying with the entire stacked bar so as to avoid associating the information with a particular bar. The aggregate information for a stacked bar can be further distinguished compared to information for individual bars, for example, by use of a different font or color. The magnified stacked bar displaying information by default is called a default magnified stacked bar. The stacked bar chart illustrated in FIG. 3 displays the x-coordinate value corresponding to each stacked bar next to the stacked bar using a label 315 parallel to the stacked bar. In one embodiment, the stacked bars are separated by width at least equal to the width of a standard bar to allow the label corresponding to the x-coordinate to be displayed along with some margin between the label and an adjacent stacked bar. Alternatively, the stacked bars may be separated by a suitable width based on the height of the label text and a suitable margin. Alternative embodiments may not display the labels corresponding to the x-coordinate values by default.

Figure 4:
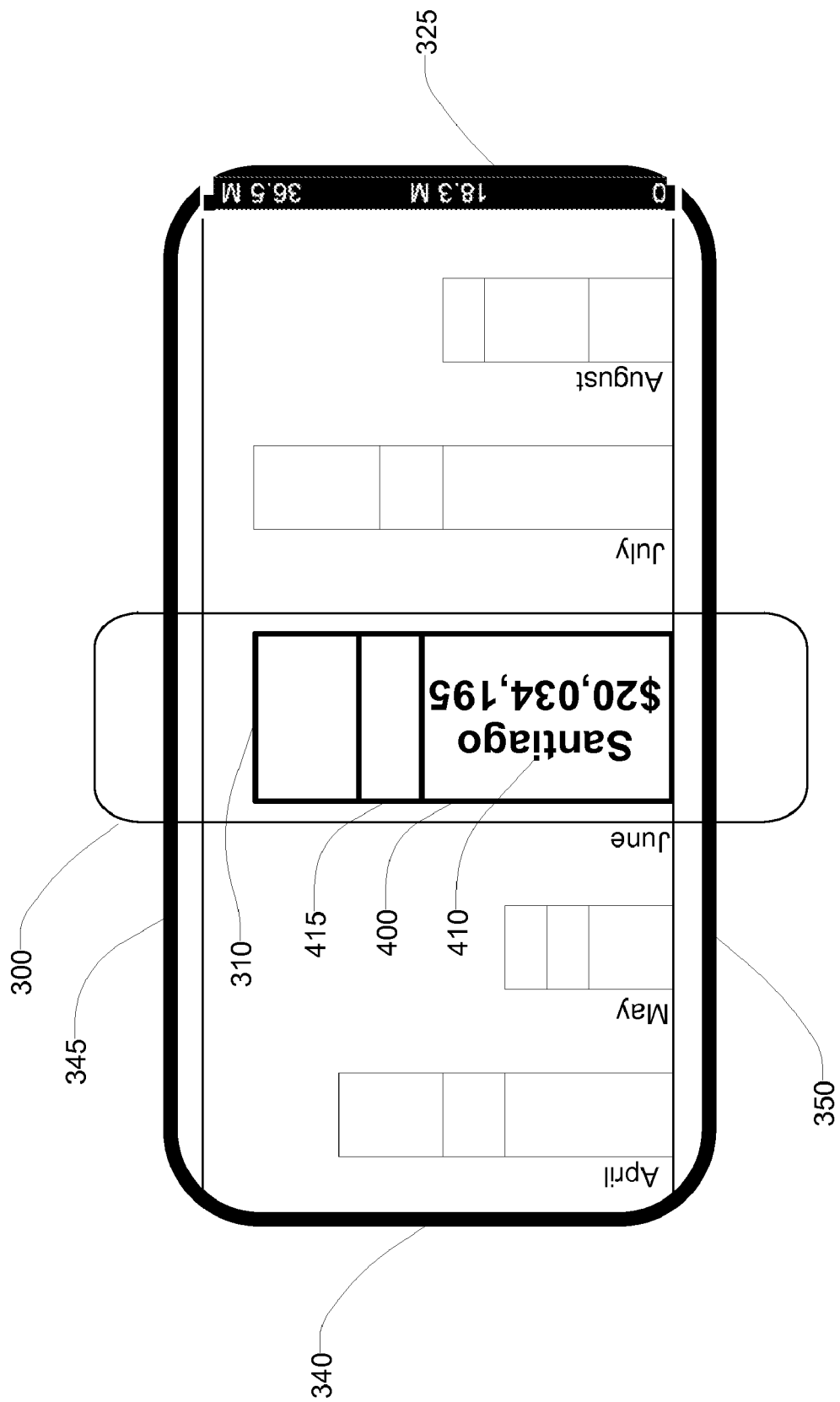
FIGS. 4-6 show how individual bars of a magnified stacked bar may be expanded to display additional information corresponding to the expanded bar.

Further magnification can be added to individual bars of a default magnified stacked bar by providing user input. As a result, individual bars are expanded to a height necessary to display additional information as illustrated in FIG. 4. The height of an expanded bar 400 can be larger than the height in the default display of the bar 320 in a default magnified stacked bar or a standard stacked bar which is determined by the y-coordinate value of the bar. An individual bar in a stacked bar can be expanded by engaging the bar. In one embodiment, a bar of the stacked bar is engaged by hovering the cursor on the specific bar with the help of a pointing device. Alternative embodiments allow engaging the bar by clicking with a pointing device when the cursor is within the region of the stacked bar. The bar within the magnified stacked bar that is engaged expands the least amount necessary to display information associated with the data point corresponding to the bar which can include its y-coordinate value. A magnified stacked bar that is not displaying a specific bar expanded with additional information is called a default magnified stacked bar. In some embodiments, the maximum height of the stacked bar with a specific bar expanded is limited to the maximum height of the chart. Alternatively, the maximum height to which a specific bar can be expanded is limited to a pre-defined maximum value. The other bars within the stacked bar retain their unexpanded height. Alternative embodiments may reduce the height of the bars not expanded to allow the engaged bar to be magnified more. The bar that is expanded does not display a height based on the y-coordinate value of the corresponding data point. Hence the expanded bar is displayed in a manner that distinguishes it from other bars displaying height based on their y-coordinate value. The expanded bar is considered to be displayed in an excited state, for example, it may be displayed as wiggling while the other bars are stationary, or it may be displayed with a different color or shading that distinguishes an expanded bar compared to bars not displayed in an excited state. Other embodiments may show the bar as flashing or pulsing. This distinction shows that the bar is not displaying a height based on its y-coordinate value. If a different bar within the stack is engaged or a different stacked bar is magnified, the bar in excited state is reverted to its normal height based on its y-coordinate value and is not displayed in an excited state. If the selected bar needs to display an amount of text that cannot be displayed within the region of the expanded bar, the text may be displayed overlaying the bar. Alternatively the text may be truncated and additional input required from the user to display the entire text. In some embodiments, the entire stacked bar may be displayed in an excited state. Embodiments that display an aggregate value associated with a default magnified stacked bar may not display the aggregate value once a specific bar is engaged and displayed in an excited state with additional information. Alternative embodiments may also increase the width of an expanded bar or the entire magnified stacked bar to allow additional information to be displayed. An increase in width may cause other bars displayed on the screen to be either reduced in width or to be moved outside the visible area of the chart.

Figure 5:
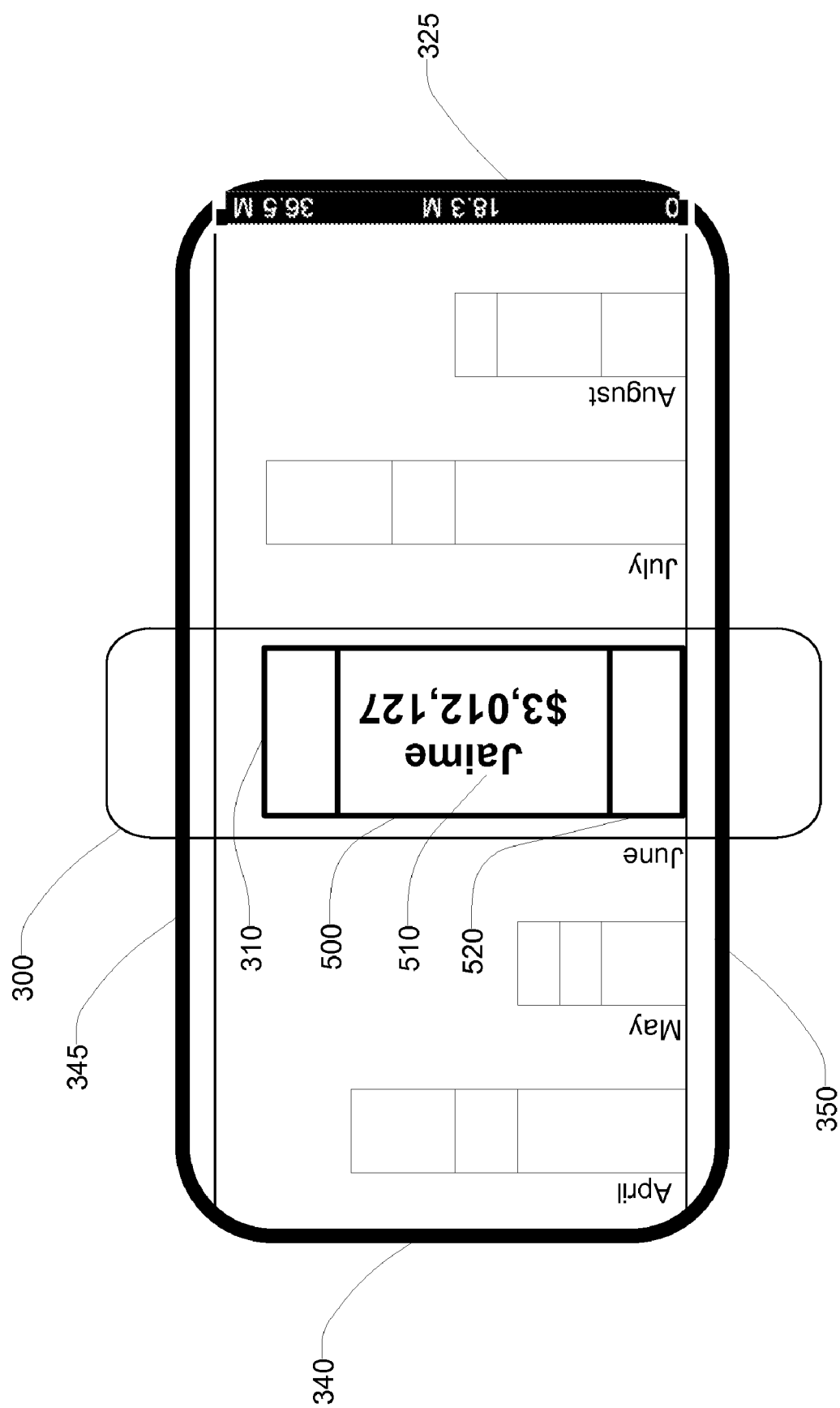
Figure 6:
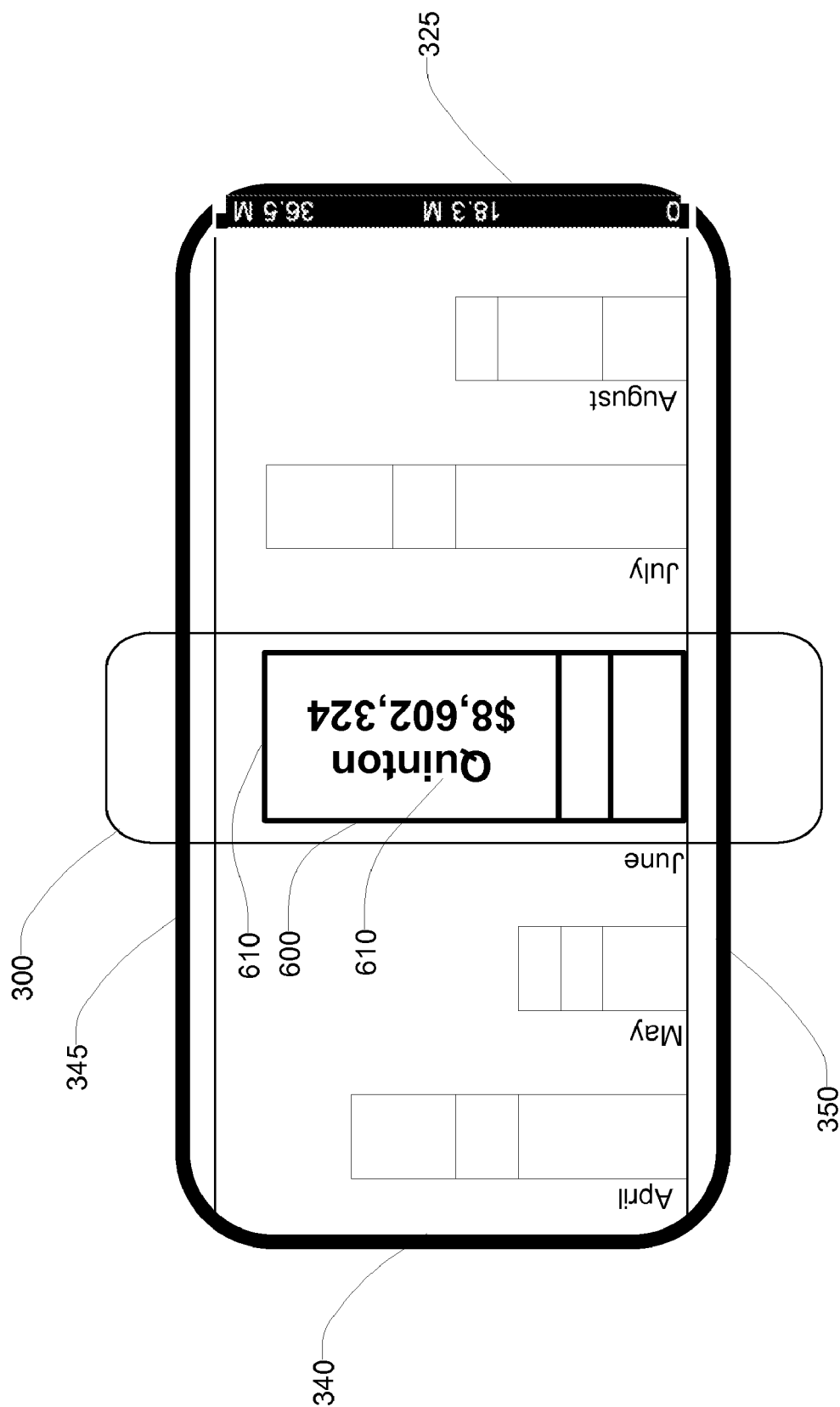
Figure 7:
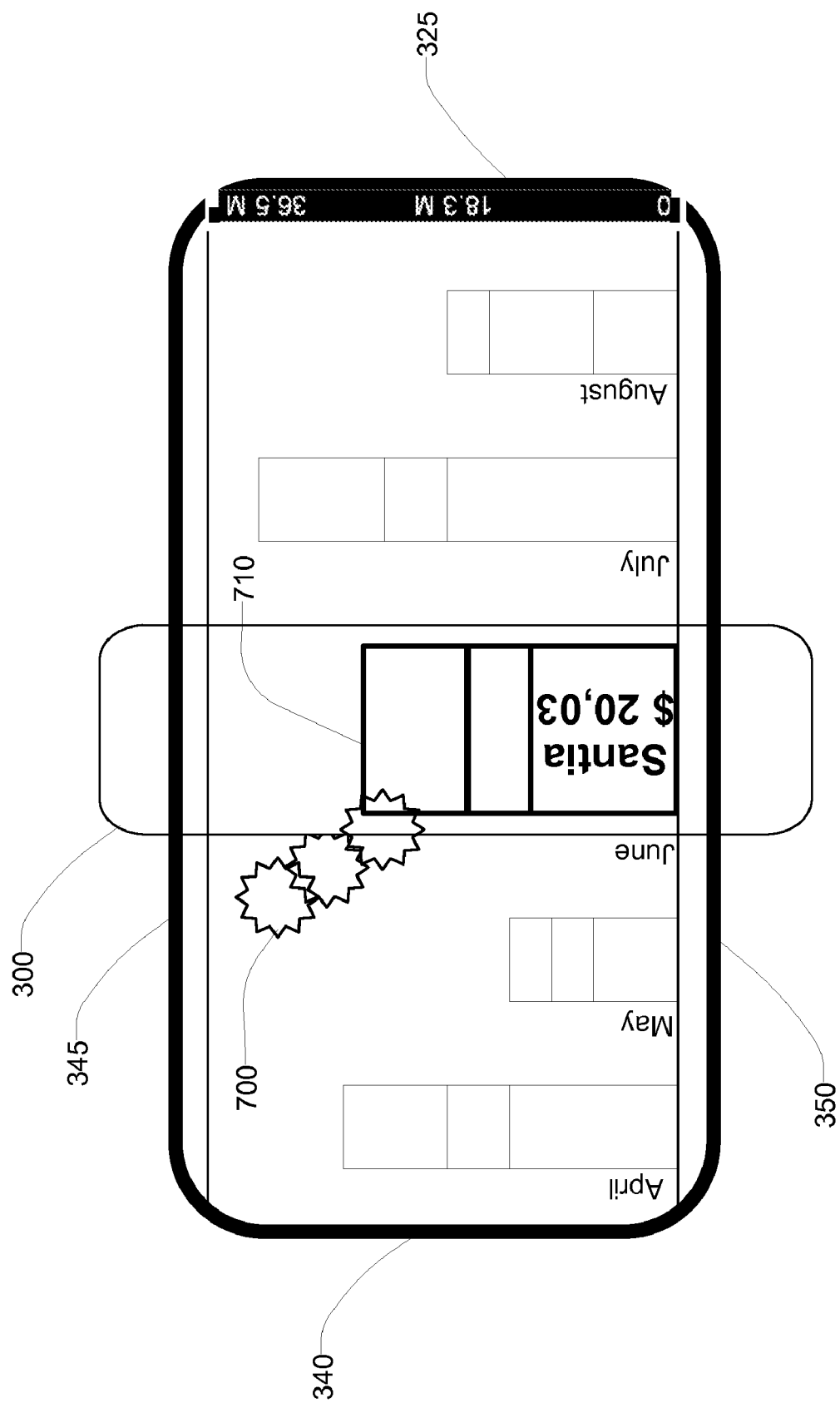
FIG. 7 illustrates how a stacked bar chart displaying an expanded bar can be changed to a default magnification stacked bar.

When the user engages a different bar within a magnified stacked bar, for example, stacked bar 500 shown in FIG. 5 or the stacked bar 600 shown in FIG. 6, the bar originally expanded 400 returns to its normal height and the stacked bar 500 or 600 newly engaged is expanded. The expanded bar 500 or 600 displays additional information associated with the bar using the label 510 or 610 respectively. In one embodiment, the transition of an unexpanded bar 415 to an expanded bar 500, the transition of a magnified stacked bar 400 to a standard stacked bar 520, is animated. For example, the transition from an unexpanded bar to an expanded bar can display bars of different sizes in between the unexpanded bar size and the expanded bar size thereby presenting a smooth transition. Another embodiment displays the transition directly from the unexpanded bar to the expanded bar or from expanded bar to unexpanded bar without displaying any intermediate stages. In one embodiment, the user can customize the animation settings; alternatively they may be determined automatically according to device type. FIG. 7 illustrates how in one embodiment, the user can provide input that causes the magnified bar 610 to be displayed as the default magnified stacked bar 710, for example, by dragging a pointing device from the expanded bar 600 to a neutral region 700 that does not correspond to any bar.

In some embodiments, more than one bar may be expanded based on user input. For example the bar that is engaged is expanded along with the bars adjacent to it. In some embodiments, the expansion of the bar engaged may be more than the expansion of the adjacent bars. In addition, the amount of information displayed may be more for the bar that was engaged by the user compared to the adjacent bars that are also expanded. Also, the bar that was engaged by the user may be distinguished compared to the adjacent bars that are expanded by using a different color, shading, or font size.

FIG. 3 displays bars in a stacked bar using rectangular shapes. Alternative embodiments can display bars using other shapes, provided a width and a height can be identified in the shape, for example, three-dimensional blocks, cylindrical shapes, or, rectangular shapes with curved edges. FIG. 3 displays a single magnified stacked bar within the magnification region 300. Other embodiments can display more stacked bars within the magnification region 300. The number of bars displayed within the magnification region can be configured by the user.

If the number of stacked bars in the bar chart is small, the entire bar chart may be displayed in the display screen 225. If the number of stacked bars in the stacked bar chart is large, only a subset of adjacent stacked bars can be displayed on the display screen 225. In this case, the user is provided with mechanisms to move the stacked bar chart relative to the magnification region 300 to be able to magnify different stacked bars. This may involve either keeping the magnification region 300 stationary and moving the chart, or keeping the chart stationary while moving the magnification region 300 or moving both. For example, the user can point at a region outside the magnification region 300 and swipe along the x-axis causing the stacked bar chart to move along the x-axis while the magnification region 300 stays in the same region of the display screen 225. Alternatively the user can select a standard stacked bar that is displayed to cause the magnification region 300 to be displayed around the newly selected standard stacked bar and the previously magnified stacked bar to be displayed as a standard stacked bar. The movement of the stacked bar chart relative to the magnification region 300 causes different stacked bars to pass through the magnification region 300. Each standard stacked bar that passes under the magnification region 300 becomes a magnified stacked bar. Once a standard stacked bar is changed to a magnified stacked bar, the individual bars of the stacked bar can be expanded to view additional information related to the bars. In one embodiment, the transition of a standard stacked bar to a magnified stacked bar or the transition of a magnified stacked bar to a standard stacked bar is animated. For example, the transition from a standard stacked bar to a magnified stacked bar can display bars of different sizes in between the standard stacked bar size and the magnified stacked bar size thereby presenting a smooth transition. Another embodiment displays the transition directly from the standard stacked bar to the magnified stacked bar or from magnified stacked bar to standard stacked bar without displaying any intermediate stages. In one embodiment, the user can customize the animation settings; alternatively they may be determined automatically according to device type.

Mechanisms are provided for the user to navigate across different portions of a chart so as to magnify them and view their details with the help of magnification region 300. The user is able to bring different parts of the chart under the magnification region 300 by providing input that causes the chart to move relative to the magnification region 300. For example, a standard bar displayed on the display screen 225 can be brought under the magnification region 300 by clicking on the standard bar. In an alternative embodiment, the magnification region 300 may be moved from one portion of the display screen to another portion so as to bring a desired standard bar within the magnification region. One embodiment allows the user to scroll the bar chart by selecting a standard bar and dragging the bar with a swiping motion of the pointing/selecting device in a particular direction. Another embodiment allows the user to swipe across any area of the display screen to scroll the bar chart. The direction of swiping indicates the direction in which the user wants the bar chart to scroll. In some embodiments, the distance the bar chart moves is determined by the magnitude of the swiping motion by the user. In another embodiment the distance the bar chart moves is determined by the speed of the swiping motion, such that swiping faster causes the bar chart to move larger distances. In yet another embodiment, the swiping action by the user may cause the bar chart to start scrolling continuously until the user provides input indicating the user wants the bar chart to stop scrolling. The user may cause the bar chart to scroll until a desired bar is in the display area. Once the desired bar is in the display area, it may be magnified by moving the magnification region to the bar, unless the bar is already in the magnification region 300. If the scrolling of the bar chart causes the bar chart to reach an end of the chart, the chart stops scrolling since no new bars can be displayed by continuing the scrolling. The ends of the bar chart correspond to the smallest and the largest x-coordinate values for which the bar chart is intended to be displayed. Once the scrolling is stopped when the user input causes the bar chart to reach an end of the bar chart, the user can cause the bar chart to scroll in the opposite direction.

Figure 8:
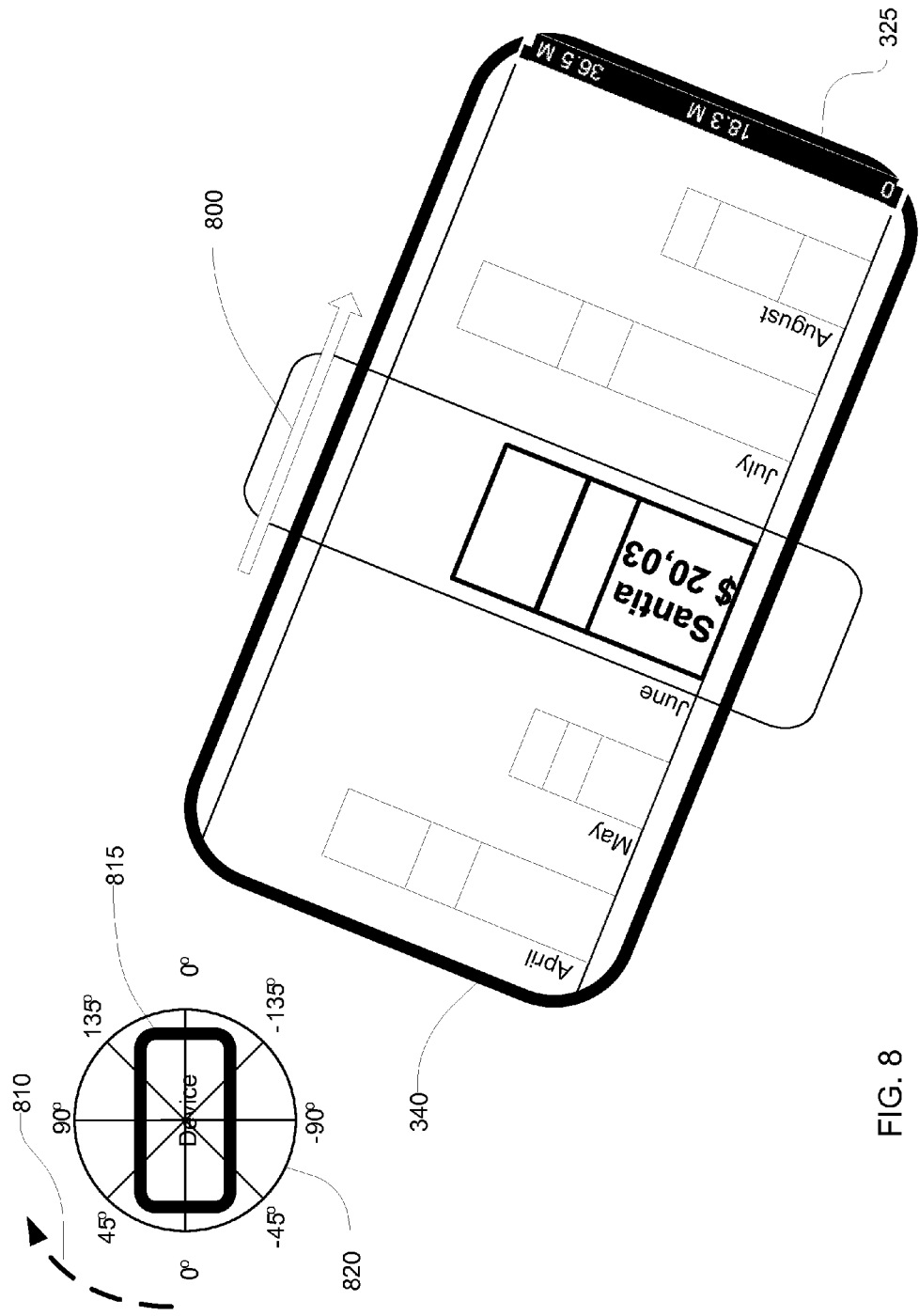
FIG. 8 shows how tilting a device displaying a stacked bar graph in a particular direction causes the stacked bar graph to scroll causing the stacked bars displayed in the magnification region to change.
Figure 9:
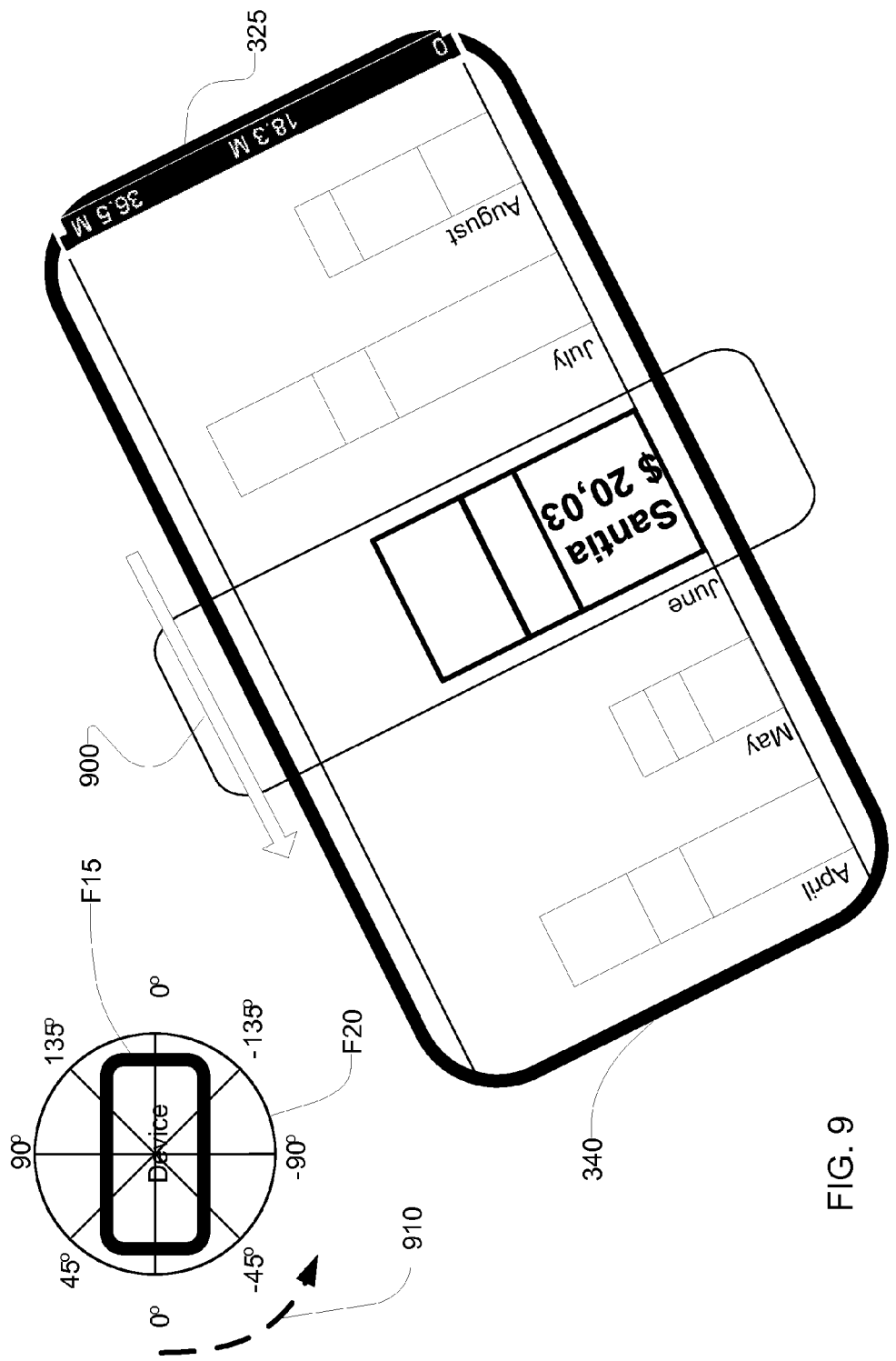
FIG. 9 shows how rotating a device in the direction opposite to that shown in FIG. 4 causes the stacked bar graph to scroll in the opposite direction.

FIG. 8 illustrates an embodiment that activates scrolling of the bar chart by tilting the display screen 225. The direction in which the bar chart scrolls is determined by the angle of tilt. The device 815 shown in FIG. 8 can be tilted along any of the angles drawn along the circle 820. The arrow 810 indicates that the angle of tilt is a positive angle less than 90°. As shown in FIG. 8, the tilt may cause the left edge 340 to be higher than the right edge 325. The tilt at the angle illustrated by arrow 810 causes the direction of scrolling of the bar chart to be 800. As the bar chart keeps scrolling, the bars displayed under the magnification region 300 keep changing. The user may choose to change the angle to tilt back to 0° to stop the scrolling action. Once the scrolling stops, the desired bar may already be under the magnification region 300 or be outside the magnification region 300 but within the display area. This allows the user to move the magnification region 300 to the desired bar or use an alternative mechanism to move the bar chart relative to the magnification region. FIG. 9 illustrates how the angle of tilt can be negative as shown by the arrow 910 causing the bar chart to scroll in direction 900, opposite to the direction 800.

In one embodiment, the speed of scrolling is determined by the magnitude of the angle of tilt. For example, in FIG. 8, if the angle of tilt 810 is selected to be 80°, the speed at which the bar chart scrolls is higher than the speed if the angle 810 was 10°. A user trying to reach a bar that is outside the display area and several bars away from the bars within the display area may start with a large angle of tilt to scroll fast towards the desired bar. The angle of tilt may be reduced as the desired bar gets closer to the display area. The angle of tilt is reduced to zero when the desired bar is within the display area causing the scrolling to stop. In certain embodiments, the speed at which the chart scrolls has a minimum or a maximum limit or both. For example, the smallest amount of tilt that is detected causes the chart to scroll at or above the minimum speed. Similarly, the maximum tilt for example, either 90° or −90° does not cause the chart to scroll any faster than the maximum scrolling speed. The minimum and the maximum speed of scrolling of the chart can be predetermined for a system or configured by the user.

In certain embodiments, changing the angle of tilt 810 to an angle within a predetermined range of angles close 90° causes the bar chart to directly move to the beginning of the bar chart corresponding to the smallest x-coordinate value that needs to be displayed. This behavior is an exception to the behavior described above, wherein the speed of scrolling of the bar chart is proportional to the magnitude of the angle. When the angle of tilt is large enough to be within a predetermined angle close to 90°, the user input causes the bar chart to directly move to the beginning of the bar chart instead of continuing to scroll. Similarly, if the angle of tilt is within a predetermined range of angles close to −90°, the end of the bar chart is displayed with the bar corresponding to the largest x-coordinate value that needs to be displayed.

Figure 10:
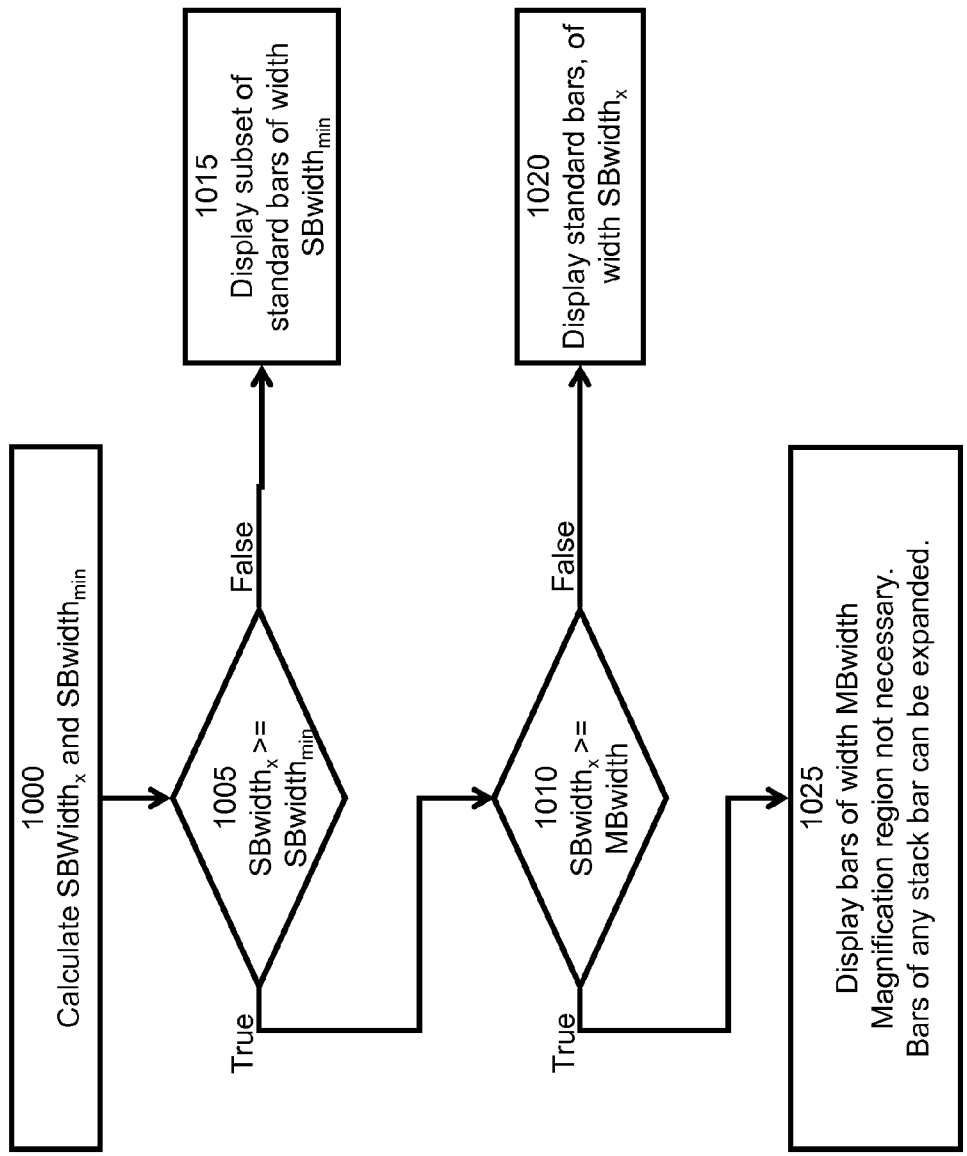
FIG. 10 shows a flowchart describing an embodiment of the process for calculating the stacked bar chart dimensions for displaying on a device with a magnification region.

The data renderer 215 determines the dimensions of the chart to be displayed on the display screen 225. FIG. 10 illustrates the process used to determine the width of stacked bars in the stacked bar chart. The calculations presented result in approximate values that can be further changed based on other criteria including aesthetics of appearance. The bar width of standard stacked bar $SBwidth_x$ is calculated 1000 using the following equation where CHARTwidth is the width of the display screen 225 used for displaying the chart and num_dp is the total number of data points in the chart. The gap between two bars is assumed to be the width of a standard bar.

$$SBwidth_x = \frac{CHARTwidth}{2 * num\_dp} \quad (1)$$

Equation (1) can be modified to calculate $SBwidth_x$ if the gap between two bars is determined by some other criteria. The minimum possible width of a standard bar $SBwidth_{min}$ is calculated 1000 as follows.

$$SBwidth_{min} = height_{min\_font} + M \quad (2)$$

In equation (2) $height_{min\_font}$ is the height of the smallest font size that can be used to display the data labels 315 and M is a predetermined value of the empty gap between two bars besides the text, for example, 0.1 point size. The standard bar width $SBwidth_x$ is compared 1005 with $SBwidth_{min}$. If the value of $SBwidth_x$ is smaller than $SBwidth_{min}$, the default view of the chart displays 1015 a subset of the standard bars of width SBwidth$_{min}$. If the value of SBwidth$_x$ is at least as large as SBwidth$_{min}$, the value SBwidth$_x$ is compared 1010 with the width of the magnified stacked bar in the magnification region MBwidth. The value of MBwidth is calculated based on the height height$_{display\_font}$ of a font predetermined for displaying text in the magnified bar.

$$MBwidth = height_{display\_font} + 2*M_{display} \quad (3)$$

The value M$_{display}$ is the margin predetermined to be displayed above and below the text in the magnified stacked bar. If the value of SBwidth$_x$ is at least as large as SBwidth$_{min}$ but smaller than MBwidth, the standard bars are displayed 1020 with width SBwidth$_x$. If the value of SBwidth$_x$ calculated above is at least as large as MBwidth the bar charts are created 1025 with a width of MBwidth and magnification region is not necessary. Furthermore, in this case, in one embodiment any stacked bar displayed can be further magnified by expanding the bars in the stacked bar. The default text displayed for a magnified bar, for example, the aggregate stacked bar value can be displayed for all stacked bars.

The x-axis in FIG. 3 is shown parallel to the bottom edge 350 and close to the bottom edge 350. The x-axis in FIG. 3 is close to the bottom edge because all the y-coordinate values corresponding to the bars are positive and are shown above the x-axis. If the y-coordinate values corresponding to certain bars are negative, the corresponding bars need to be displayed below the x-axis. In this case, the x-axis is placed somewhere in between the top and bottom edge of the chart area. If all y-coordinate values of the data points are positive, the maximum height of a bar can be determined to be the same as the height of the chart area. The height Bheight$_x$ of any bar is determined by scaling the value appropriately based on the maximum height of the bars.

$$Bheight_x = \frac{height_{chart\_area}}{DP_{max}} * DP_x \quad (3)$$

In equation (3), the height$_{chart\_area}$ is the height of the chart area that corresponds to the maximum height of the stacked bars, DP$_{max}$ is the value of the y-coordinate corresponding to the stacked bar with maximum height, and DP$_x$ is the y-coordinate value corresponding to the stacked bar for which the height Bheight$_x$ is being calculated. The heights of the individual bars are scaled appropriately based on their y-coordinate values.

If all the y-coordinate values corresponding to the bars of the stacked bars are negative, all the bars have to be displayed below the x-axis. In this case, the x-axis may be displayed close to the top edge 345 of the display screen. The height of each bar is calculated by the following equation.

$$Bheight_x = \frac{height_{chart\_area}}{|DP_{min}|} * DP_x \quad (4)$$

The tallest stacked bar corresponds to the minimum y-coordinate value DP$_{min}$. Since the DP$_{min}$ value is negative, equation (3) uses the absolute function, represented by |DP$_{min}$| to compute a positive Bheight$_x$ value.

If the bar chart needs to display stacked bars including individual bars with positive as well as negative y-coordinate values, the positive bars are displayed above the x-axis and the negative bars below the x-axis. In this case, the x-axis is displayed between the lower chart edge 355 and the upper chart edge 360 such that the stacked bars can be displayed on either side of the x-axis. In one embodiment, the distance Xheight of the x-axis from the lower edge 355 is calculated based on equation (5):

$$Xheight = \frac{|DP_{min}| * height_{chart\_area}}{(|DP_{min}| + DP_{max})} \quad (5)$$

Essentially, the x-axis is displayed above the lower chart edge 355 such that the minimum cumulative y-coordinate value DP$_{min}$ of negative bars within a stacked bar can be displayed below the x-axis and the maximum cumulative y-coordinate value DP$_{max}$ of positive bars within a stacked bars can be displayed above the x-axis. The height of a bar Bheight$_x$ in this case is calculated using the equation (6).

$$Bheight_x = \frac{DP_x * height_{chart\_area}}{(|DP_{min}| + DP_{max})} \quad (6)$$

In certain embodiments, the bar chart may be displayed such that the x and the y axes are transposed.

It is to be understood that the Figures and descriptions of the present invention have been simplified to illustrate elements that are relevant for a clear understanding of the present invention, while eliminating, for the purpose of clarity, many other elements found in a typical system that allows users to view report data. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying stacked bar charts through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method for displaying on a display screen of a mobile device a chart representing a plurality of data points, the method comprising:
    displaying a set of data points on the display screen, each data point associated with an x-coordinate value and a y-coordinate value, each data point displayed with a shape having a first fixed width and a height based on the y-coordinate value of the data point;
    responsive to receiving a first user input identifying an x-coordinate value having an associated plurality of data points:
        altering display of the plurality of shapes associated with the identified x-coordinate value to display the shapes with a second fixed width larger than the first fixed width;
    responsive to receiving a second user input identifying a first shape associated with the identified x-coordinate value and a first y-coordinate value:
        altering display of the first shape to display the first shape with an increased height, such that the increased height of the first shape does not correspond to the first y-coordinate value; and
        displaying information associated with the first shape overlaying the first shape;
    responsive to receiving a third user input identifying a second shape associated with the identified x-coordinate value and a second y-coordinate value:
        altering display of the second shape to display the second shape with an increased height, such that the increased height of the second shape does not correspond to the second y-coordinate value; and
        displaying information associated with the second shape overlaying the second shape.

2. The method of claim 1, wherein the chart is a stacked bar chart.

3. The method of claim 1, further comprising:
    responsive to receiving the second user input, displaying a third shape associated with the data point with a reduced height.

4. The method of claim 1, further comprising:
    responsive to receiving the third user input, altering the first shape to display height based on the y-coordinate value of the first data point.

5. The method of claim 1, further comprising:
    responsive to receiving the second user input, altering display of a first shape to wiggle.

6. The method of claim 1, further comprising:
    responsive to receiving the second user input, altering display of a first shape to flash.

7. The method of claim 1, further comprising:
    displaying the x-coordinate value of the data points associated with the x-coordinate adjacent to the plurality of shapes.

8. The method of claim 1, further comprising:
    displaying an aggregate y-coordinate value based on the data points with the x-coordinate value overlaying a subset of the plurality of shapes.

9. The method of claim 1, further comprising: responsive to receiving the third user input, altering display of the first shape to reduce the height of the first shape such that the reduced height corresponds to the first y-coordinate value.

10. The method of claim 1, wherein the x-coordinate value is a first x-coordinate value and responsive to receiving the first user input:
    altering display of a plurality of shapes associated with a second x-coordinate value to display the shapes with a width smaller than the first fixed width.

11. The method of claim 1, wherein the x-coordinate value is a first x-coordinate value, the method further comprising:
    altering display of a plurality of shapes associated with a second x-coordinate value to cause the shapes to move out of a visible area of the chart.

12. The method of claim 1, wherein the x-coordinate value is a first x-coordinate value, the method further comprising:
    responsive to receiving a fourth user input identifying a second x-coordinate value having an associated plurality of data points:
        altering display of the plurality of shapes associated with the second x-coordinate value to display the shapes with a second fixed width larger than the first fixed width; and
        altering display of the plurality of shapes associated with the first x-coordinate value to display the first plurality of shapes with the first fixed width.

13. The method of claim 1, wherein the method further comprises:
    responsive to receiving the second user input:
        altering display of shapes adjacent to the first shape such that the increased height of the adjacent shapes does not correspond to their corresponding y-coordinate values and the expansion of the first shape is more than the expansion of the adjacent shapes.

14. The method of claim 1, wherein the second input is of a particular input type and receiving an input of the particular input type for a shape associated with another x-coordinate value does not alter the shape to display the shape with an increased height.

15. A system for displaying on a display screen of a mobile device a chart representing a plurality of data points, the system comprising:
 a computer processor; and
 a computer-readable storage medium storing computer program modules configured to execute on the computer processor, the computer program modules comprising:
  an input/output driver module configured to:
   display a set of data points on the display screen, each data point associated with an x-coordinate value and a y-coordinate value, a plurality of data points associated with an x-coordinate value, each data point displayed with a shape having a first fixed width and a height based on the y-coordinate value of the data point;
   responsive to receiving a first user input identify an x-coordinate value having an associated plurality of data points:
    alter display of the plurality of shapes associated with the identified x-coordinate value to display the shapes with a second fixed width larger than the first fixed width;
   responsive to receiving a second user input identify a first shape associated with the identified x-coordinate value and a first y-coordinate value:
    alter display of the first shape to display the shape with an increased height, such that the increased height of the first shape does not correspond to the first y-coordinate value; and
    display information associated with the first shape overlaying the first shape; and
   responsive to receiving a third user input identify a second shape associated with the identified x-coordinate value and a second y-coordinate value:
    alter display of the second shape to display the second shape with an increased height, such that the increased height of the second shape does not correspond to the second y-coordinate value; and
    display information associated with the second shape overlaying the second shape.

16. The system of claim 15, wherein the chart is a stacked bar chart.

17. The system of claim 15, wherein the input/output driver module is further configured to:
 responsive to receiving the second user input, display a third shape associated with the data point with a reduced height.

18. The system of claim 15, wherein the input/output driver module is further configured to:
 responsive to receiving the third user input, alter the first shape to display height based on the y-coordinate value of the first data point.

19. The system of claim 15, wherein the input/output driver module is further configured to:
 responsive to receiving the second user input, alter display of a first shape to wiggle.

20. The system of claim 15, wherein the input/output driver module is further configured to:
 responsive to receiving the second user input, alter display of a first shape to flash.

21. A computer program product having a non-transitory computer-readable storage medium storing computer-executable code for displaying on a display screen of a mobile device a chart representing a plurality of data points, the code comprising:
 an input/output driver module configured to:
  display a set of data points on the display screen, each data point associated with an x-coordinate value and a y-coordinate value, a plurality of data points associated with an x-coordinate value, each data point displayed with a shape having a first fixed width and a height based on the y-coordinate value of the data point;
  responsive to receiving a first user input identify an x-coordinate value having an associated plurality of data points:
   alter display of the plurality of shapes associated with the identified x-coordinate value to display the shapes with a second fixed width larger than the first fixed width;
  responsive to receiving a second user input identify a first shape associated with the identified x-coordinate value and a first y-coordinate value:
   alter display of the first shape to display the shape with an increased height, such that the increased height of the first shape does not correspond to the first y-coordinate value; and
   display information associated with the first shape overlaying the first shape; and
  responsive to receiving a third user input identify a second shape associated with the identified x-coordinate value and a second y-coordinate value:
   alter display of the second shape value to display the second shape with an increased height, such that the increased height of the second shape does not correspond to the second y-coordinate value; and
   display information associated with the second shape overlaying the second shape.

22. The computer program product of claim 21, wherein the chart is a stacked bar chart.

23. The computer program product of claim 21, wherein the input/output driver module is further configured to:
 responsive to receiving the second user input, display a third shape associated with the data point with a reduced height.

24. The computer program product of claim 21, wherein the input/output driver module is further configured to:
 responsive to receiving the third user input, alter the first shape to display height based on the y-coordinate value of the first data point.

25. The computer program product of claim 21, wherein the input/output driver module is further configured to:
 responsive to receiving the second user input, alter display of a first shape to wiggle.

26. The computer program product of claim 21, wherein the input/output driver module is further configured to:
 responsive to receiving the second user input, alter display of a first shape to flash.

* * * * *